US011397023B2

(12) United States Patent
Xing et al.

(10) Patent No.: US 11,397,023 B2
(45) Date of Patent: Jul. 26, 2022

(54) CONNECTION MEMBER, MOUNTING BRACKET ASSEMBLY, AND WINDOW AIR CONDITIONER ASSEMBLY

(71) Applicants: GD MIDEA AIR-CONDITIONING EQUIPMENT CO., LTD., Foshan (CN); MIDEA GROUP CO., LTD., Foshan (CN)

(72) Inventors: Zhigang Xing, Foshan (CN); Zhisheng Lei, Foshan (CN)

(73) Assignees: GD MIDEA AIR-CONDITIONING EQUIPMENT CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 116 days.

(21) Appl. No.: 16/900,948

(22) Filed: Jun. 14, 2020

(65) Prior Publication Data

US 2021/0180828 A1 Jun. 17, 2021

Related U.S. Application Data

(63) Continuation of application No. PCT/CN2020/079033, filed on Mar. 12, 2020, which
(Continued)

(30) Foreign Application Priority Data

Dec. 17, 2019 (CN) .......................... 201922288436.6
Feb. 21, 2020 (CN) .......................... 202010110582.4
(Continued)

(51) Int. Cl.
*F24F 13/32* (2006.01)
*F24F 1/031* (2019.01)
*F16M 13/02* (2006.01)

(52) U.S. Cl.
CPC ............ *F24F 13/32* (2013.01); *F16M 13/022* (2013.01); *F24F 1/031* (2019.02); *F24F 2221/20* (2013.01)

(58) Field of Classification Search
CPC ........ F24F 13/32; F24F 1/027; F24F 2221/20; F24F 1/031
See application file for complete search history.

(56) References Cited

U.S. PATENT DOCUMENTS 2,608,148 A * 8/1952 Shapiro .................. F24F 13/32
454/204
2,891,754 A * 6/1959 Kuhlenschmidt ....... F24F 13/32
62/262
(Continued)

FOREIGN PATENT DOCUMENTS

CN 1542334 A 11/2004
CN 107327978 A 11/2017
(Continued)

OTHER PUBLICATIONS

World Intellectual Property Organization (WIPO) International Search Report and Written Opinion for PCT/CN2020/078833 with translation Sep. 22, 2020 18 Pages.
(Continued)

*Primary Examiner* — Eret C McNichols
(74) *Attorney, Agent, or Firm* — Anova Law Group PLLC

(57) ABSTRACT

A connection member includes a first connection portion and a second connection portion. The first connection portion is configured to be connected to a window air conditioner and extends along a direction. The second connection portion is connected to the first connection portion and is configured to be connected to a mounting bracket assembly.

20 Claims, 8 Drawing Sheets

Related U.S. Application Data is a continuation of application No. PCT/CN2020/078833, filed on Mar. 11, 2020.

(30) Foreign Application Priority Data

| Feb. 21, 2020 | (CN) | .......................... 202010110583.9 |
| Feb. 21, 2020 | (CN) | .......................... 202010110584.3 |
| Feb. 21, 2020 | (CN) | .......................... 202010110585.8 |
| Feb. 21, 2020 | (CN) | .......................... 202020197814.X |
| Feb. 21, 2020 | (CN) | .......................... 202020197831.3 |
| Feb. 21, 2020 | (CN) | .......................... 202020197833.2 |
| Feb. 21, 2020 | (CN) | .......................... 202020197924.6 |

(56) References Cited

U.S. PATENT DOCUMENTS

| 7,350,759 | B1 * | 4/2008 | Gray | .................. F24F 1/027 248/644 |
| 8,584,998 | B1 * | 11/2013 | Peterson | ................ F24F 13/32 182/62 |
| 9,163,854 | B2 * | 10/2015 | Arbucci | .................... E04G 3/18 |
| 10,359,212 | B2 * | 7/2019 | Darby | .................... F24F 1/027 |
| 11,168,920 | B1 * | 11/2021 | Leezer | .................... F24F 1/031 |
| 2017/0328596 | A1 * | 11/2017 | Darby | .................... F24F 13/32 |
| 2018/0023842 | A1 * | 1/2018 | Gardikis, Sr. | .......... F16M 13/02 248/674 |
| 2020/0248911 | A1 * | 8/2020 | Lei | .......................... F24F 13/32 |
| 2021/0180804 | A1 * | 6/2021 | Xing | .......................... F24F 1/62 |
| 2021/0199312 | A1 * | 7/2021 | Xing | ...................... F24F 1/031 |
| 2021/0325054 | A1 * | 10/2021 | Zhao | ...................... F24F 13/32 |
| 2021/0341175 | A1 * | 11/2021 | Leezer | .................... F24F 1/027 |
| 2021/0355750 | A1 * | 11/2021 | Liang | ...................... F24F 1/031 |
| 2021/0356146 | A1 * | 11/2021 | Zhang | ...................... F24F 1/02 |

FOREIGN PATENT DOCUMENTS

| CN | 108645004 | A | 10/2018 |
| CN | 208606292 | U | 3/2019 |
| CN | 208671190 | U | 3/2019 |
| CN | 208804781 | U | 4/2019 |
| CN | 209689082 | U | 11/2019 |
| CN | 110966687 | A | 4/2020 |
| CN | 111189121 | A | 5/2020 |
| CN | 111189123 | A | 5/2020 |
| CN | 111306645 | A | 6/2020 |
| CN | 211261044 | U | 8/2020 |
| CN | 211261058 | U | 8/2020 |
| CN | 211261059 | U | 8/2020 |
| KR | 20030080778 | A | 10/2003 |

OTHER PUBLICATIONS

World Intellectual Property Organization (WIPO) International Search Report and Written Opinion for PCT/CN2020/079033 with translation Sep. 23, 2020 18 Pages.

* cited by examiner

CONNECTION MEMBER, MOUNTING BRACKET ASSEMBLY, AND WINDOW AIR CONDITIONER ASSEMBLY

CROSS-REFERENCE TO RELATED APPLICATIONS

This application is a continuation of International Application No. PCT/CN2020/078833, filed on Mar. 11, 2020, which claims priority to Chinese Application No. 201922288436.6, filed on Dec. 17, 2019, and Chinese Application Nos. 202010110582.4, 202020197831.3, 202010110585.8, and 202020197924.6, all filed on Feb. 21, 2020. This application is also a continuation of International Application No. PCT/CN2020/079033, filed on Mar. 12, 2020, which claims priority to Chinese Application No. 201922288436.6, filed on Dec. 17, 2019, and Chinese Application Nos. 202020197833.2, 202010110584.3, 202010110583.9, and 202020197814.X, all filed on Feb. 21, 2020. The entire contents of all of the above-referenced prior applications are incorporated herein by reference.

TECHNICAL FIELD

The present disclosure relates to the technical field of air conditioner installation, in particular to a connection member, a mounting bracket assembly, and a window air conditioner assembly.

BACKGROUND

In the related art, the window air conditioner is usually placed directly on the mounting bracket assembly mounted at the window, and is fixed by the gravity of the window air conditioner itself. As such, the installation of the window air conditioner is unstable, for example, it is relatively easy to be lifted up to the outside or pushed down to the inside.

SUMMARY

The main objective of the present disclosure is to provide a connection member, a mounting bracket assembly, and a window air conditioner assembly, aiming to solve the technical problem that the window air conditioner is not stably mounted.

In order to achieve the above objective, the present disclosure provides a connection member, applied to a mounting bracket assembly for mounting a window air conditioner, the connection member includes: a first connection portion, the first connection portion being configured to extend in a direction from an outdoor side of the window air conditioner to an indoor side of the window air conditioner, the first connection portion being configured to be connected to the window air conditioner; and a second connection portion connected to the first connection portion, the second connection portion being configured to be connected to the mounting bracket assembly.

In some embodiments, the first connection portion includes support connection positions sequentially distributed in the direction from the outdoor side of the window air conditioner to the indoor side of the window air conditioner, the support connection positions being configured to be selectively connected to the window air conditioner.

In some embodiments, the first connection portion is provided with a support connection hole, the support connection hole being an elongated hole extending in the direction from the outdoor side of the window air conditioner to the indoor side of the window air conditioner, the support connection positions being formed at the support connection hole.

In some embodiments, the first connection portion is provided with connection holes sequentially spaced in a direction from the outdoor side of the window air conditioner to the indoor side of the window air conditioner to form a plurality of support connection positions.

In some embodiments, the second connection portion includes a horizontal fixation portion, the horizontal fixation portion being configured to extend in a length direction of a window sill and be connected to the mounting bracket assembly.

In some embodiments, a second fixation connection hole is provided at the horizontal fixation portion, the second fixation connection hole being configured to be cooperatively connected with the first fixation connection hole on the mounting bracket assembly.

In some embodiments, the second fixation connection hole is an elongated hole extending in the length direction of the window sill.

In some embodiments, the horizontal fixation portion is a horizontal fixation plate.

In some embodiments, the second connection portion further includes a vertical support portion extending in an up-down direction, the first connection portion being provided at one end of the vertical support portion, the horizontal fixation portion being provided at the other end of the vertical support portion.

In some embodiments, the vertical support portion is a vertical support plate, and the first connection portion is a horizontal connection plate.

In some embodiments, the vertical support plate is coplanar with the horizontal connection plate.

The present disclosure further provides a mounting bracket assembly for mounting a window air conditioner, wherein the mounting bracket assembly includes:

a support bracket, one end of the support bracket being configured to be mounted inside a window frame, the other end of the support bracket being configured to extend outside; and a connection member, an upper end of the connection member being configured to be connected to the window air conditioner, a lower end of the connection member being connected to the support bracket.

In some embodiments, the connection member is configured to be provided inside the window frame; and/or an upper end of the connection member is configured to be connected to a side of the window air conditioner.

In some embodiments, the upper end of the connection member includes support connection positions sequentially distributed in a direction from one end of the support bracket to the other end of the support bracket, the support connection positions being configured to be selectively connected to the window air conditioner.

In some embodiments, the upper end of the connection member is provided with a support connection hole, the support connection hole being an elongated hole extending in the direction from one end of the support bracket to the other end of the support bracket, the support connection positions being provided at the support connection hole.

In some embodiments, the connection member includes a vertical support plate extending in an up-down direction and a horizontal connection plate provided at an upper end of the vertical support plate, the horizontal connection plate being configured to extend in the direction from one end of the support bracket to the other end of the support bracket, the support connection positions being provided at the horizontal connection plate, a lower end of the vertical support plate being connected to the support bracket.

In some embodiments, the horizontal connection plate is configured to extend away from the window frame; and/or the connection member further includes a horizontal fixation plate provided at a lower end of the vertical support plate, the horizontal fixation plate being configured to extend in a length direction of a window sill, the horizontal fixation plate being connected to the support bracket.

In some embodiments, the support bracket includes a lateral fixation member configured to be fixed to an inner side of the window frame, the lateral fixation member being configured to extend in a length direction of a window sill, the lateral fixation member including a lateral limiting member configured to abut against the inner side of the window frame and two lateral extension members provided at two ends of the lateral limiting member, respectively, an end of one of the two lateral extension members away from the lateral limiting member being configured to be connected to a side wall of the window, the lateral extension member and the lateral limiting member being movably matched in the length direction of the window sill, a length of the lateral fixation member in the length direction of the window sill being adjustable, a lower end of the connection member being mounted at the lateral extension member.

In some embodiments, the connection member is movable relative to the lateral extension member in a length direction of the lateral extension member, and a connection position between a lower end of the connection member and the lateral extension member is adjustable in the length direction of the lateral extension member.

In some embodiments, the lateral extension member includes an extension bottom plate, a first extension side plate, and a second extension side plate, the first extension side plate and the second extension side plate being disposed at opposite side edges of the extension bottom plate, respectively, the extension bottom plate being provided with first fixation connection holes spaced apart from each other in the length direction of the lateral extension member, the horizontal fixation plate of the connection member being provided with second fixation connection holes matching the first fixation connection holes.

In some embodiments, the outdoor support is an outdoor oblique support, the outdoor oblique support is inclined, one end of the outdoor oblique support is connected to the support bracket, and the other end of the outdoor oblique support is configured to abut against the wall.

The present disclosure further provides a window air conditioner assembly, including:

the mounting bracket assembly as described above, the mounting bracket assembly being configured for mounting at a window of a wall; and a window air conditioner mounted at the mounting bracket assembly.

In some embodiments, the first connection portion is connected to a side of the window air conditioner.

In some embodiments, the window air conditioner includes a division groove configured to divide the window air conditioner into an indoor portion and an outdoor portion, the division groove being configured for a shield member provided at the window to extend into.

In the technical solutions of the present disclosure, the connection member is connected to the support bracket and the window air conditioner. When the connection member is provided at the inner side of the window frame, the connection member can restrict the window air conditioner. For example, when the window air conditioner is lifted up, the connection member can pull the window air conditioner to prevent the window air conditioner from being lifted up to the outside. As another example, when the window air conditioner is pressed down, the connection member may support the window air conditioner to prevent the window air conditioner from being pressed down and falling to the inside.

When the connection member is provided at the outer side of the window frame, the connection member can restrict the window air conditioner. For example, when the window air conditioner is lifted up, the connection member can pull the window air conditioner to prevent the window air conditioner from being lifted up to the outside. As another example, when the window air conditioner is pressed downwards, the connection member may pull the window air conditioner to prevent the window air conditioner from being pressed down and falling to the inside.

That is to say, connecting the connection member to the support bracket and the window air conditioner, not only can the window air conditioner be prevented from being lifted up to the outside, but also the window air conditioner can be prevented from being pushed down and falling to the inside, thereby improving the mounting stability of the window air conditioner.

BRIEF DESCRIPTION OF THE DRAWINGS

In order to more clearly illustrate the embodiments of the present disclosure, drawings used in the embodiments will be briefly described below. Obviously, the drawings in the following description are only some embodiments of the present disclosure. It will be apparent to those skilled in the art that other figures can be obtained according to the structures shown in the drawings without creative work.

DESCRIPTION OF REFERENCE NUMERALS

TABLE 1

Figure 1:
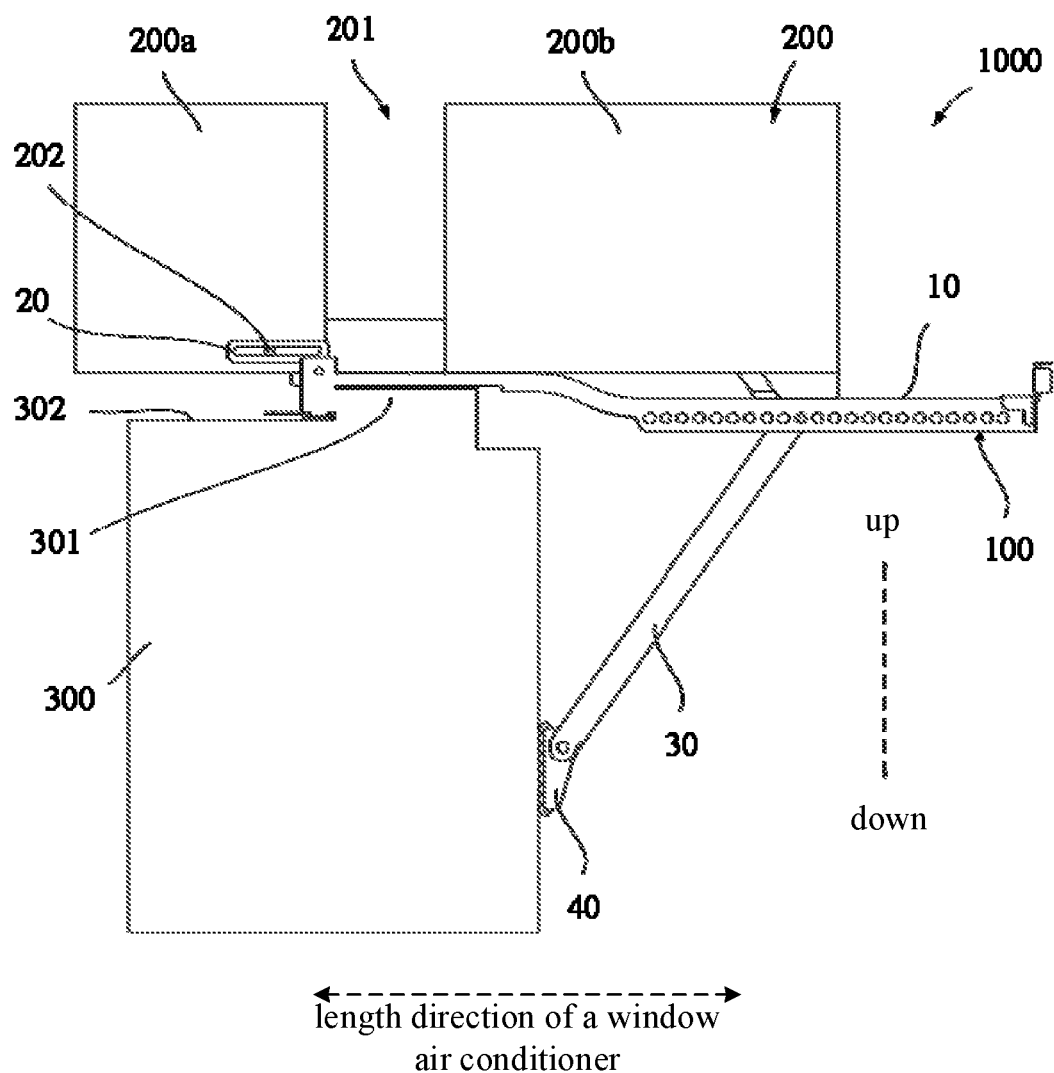
FIG. 1 is a schematic structural diagram of a window air conditioner assembly mounted at a window according to an embodiment of the present disclosure.

| Label | Name |
|---|---|
| 100 | mounting bracket assembly |
| 10 | support bracket |
| 11 | support plate |
| 111 | inner support portion |
| 112 | intermediate connection portion |
| 113 | outer support portion |
| 1 | lateral fixation member |

TABLE 1-continued

| Label | Name |
| --- | --- |
| 12 | lateral limiting member |
| 121 | limiting top plate |
| 122 | first limiting side plate |
| 1221 | first connection hole |
| 123 | second limiting side plate |
| 124 | limiting bottom plate |
| 125 | first opening |
| 126 | second opening |
| 127 | third opening |
| 13 | lateral extension member |
| 131 | extension bottom plate |
| 1311 | first fixation connection hole |
| 132 | first extension side plate |
| 133 | second extension side plate |
| 1331 | auxiliary connection hole |
| 134 | extension mounting portion |
| 1341 | extension mounting plate |
| 1342 | extension reinforcement plate |
| 14 | lateral connection plate |
| 20 | connection member |
| 231 | horizontal connection plate |
| 2311 | support connection hole |
| 232 | vertical support plate |
| 233 | horizontal fixation plate |
| 2331 | second fixation connection hole |
| 30 | outdoor oblique support |
| 40 | support foot |
| 200 | window air conditioner |
| 200a | indoor portion |
| 200b | outdoor portion |
| 201 | division groove |
| 202 | preset connection position |
| 300 | wall |
| 301 | window frame |
| 302 | window sill |
| 1000 | window air conditioner assembly |

The realization of the objective, functional characteristics, and advantages of the present disclosure are further described with reference to the accompanying drawings.

DETAILED DESCRIPTION OF THE EMBODIMENTS

The technical solutions of the embodiments of the present disclosure will be described in more detail below with reference to the accompanying drawings. It is obvious that the embodiments to be described are only some rather than all of the embodiments of the present disclosure. All other embodiments obtained by persons skilled in the art based on the embodiments of the present disclosure without creative efforts shall fall within the scope of the present disclosure.

It should be noted that, the descriptions associated with, e.g., "first" and "second," in the present disclosure are merely for descriptive purposes, and cannot be understood as indicating or suggesting relative importance or impliedly indicating the number of the indicated technical feature. Therefore, the feature associated with "first" or "second" can expressly or impliedly include at least one such feature.

Besides, the meaning of "and/or" appearing in the disclosure includes three parallel scenarios. For example, "A and/or B" includes only A, or only B, or both A and B.

The present disclosure provides a mounting bracket assembly 100 and a window air conditioner assembly 1000. As shown in FIGS. 1 to 8, the window air conditioner assembly 1000 includes a window air conditioner 200 and a mounting bracket assembly 100, and the mounting bracket assembly 100 is configured to mount the window air conditioner 200.

As shown in FIG. 1, the mounting bracket assembly 100 is mounted at a window of a wall 300 to support and fix an object to the wall 300. The object may be the window air conditioner 200 or the like, and the window air conditioner 200 will be taken as an example for description below. The window includes a window sill 302, and a window frame 301 is provided at the window sill 302. A length direction of the window sill 302 is a width direction of the window, that is, the length direction of the window frame 301.

Figure 2:
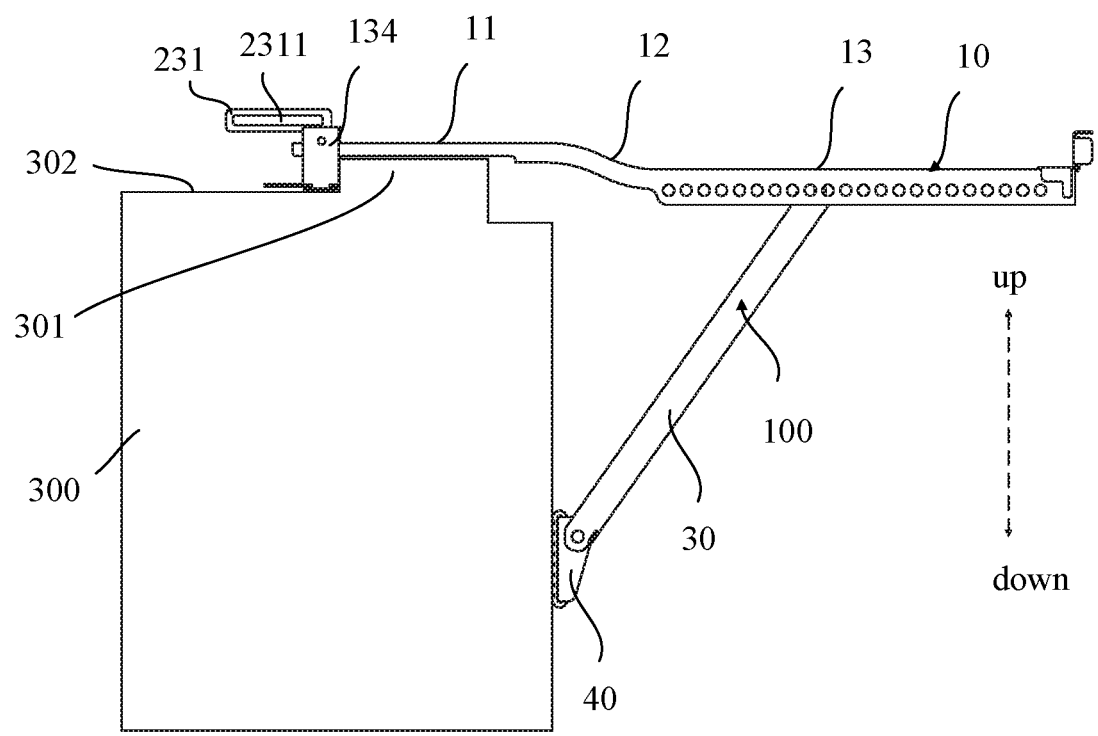
FIG. 2 is a schematic structural diagram of a mounting bracket assembly mounted at the window according to an embodiment of the present disclosure.
Figure 5:
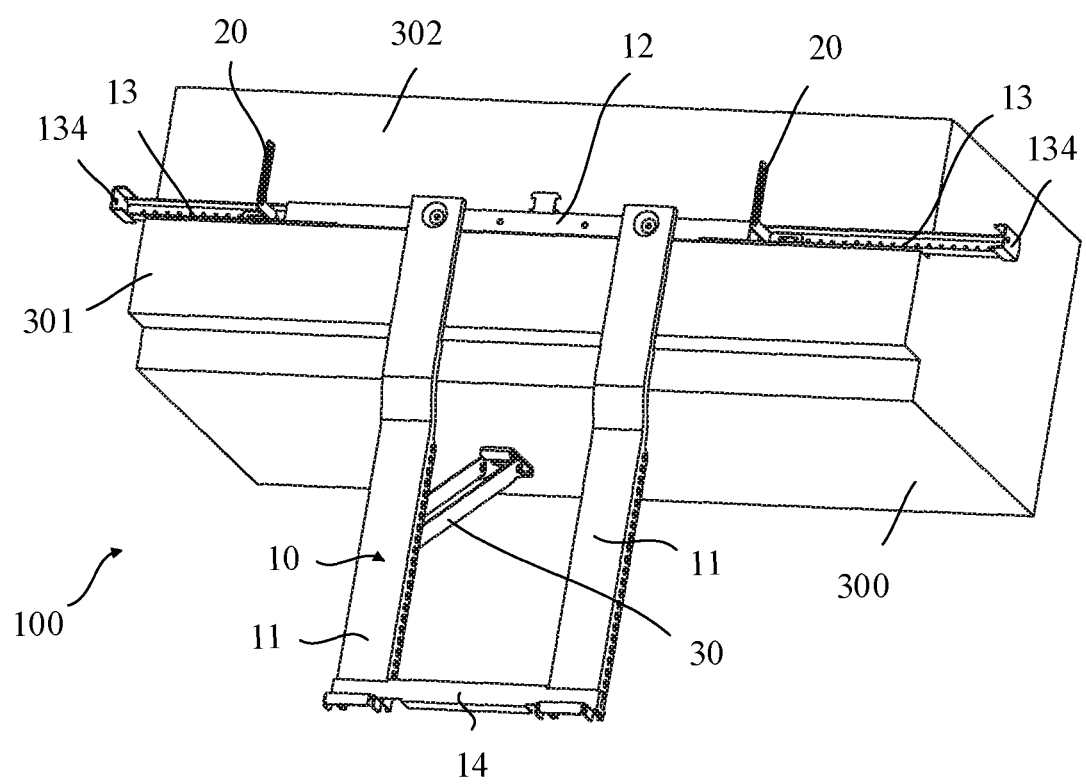
FIG. 5 is a perspective view of the mounting bracket assembly in FIG. 2 viewing from the top.

As shown in FIGS. 1, 2 and 5, the mounting bracket assembly 100 includes a support bracket 10, a connection member 20, and an outdoor support.

As shown in FIG. 1, the support bracket 10 is provided at a bottom of the window air conditioner 200, one end of the support bracket 10 is mounted inside the window frame 301, and the other end of the support bracket 10 extends outdoors. Specifically, an inner end of the support bracket 10 (the end towards the indoor) is fixedly mounted inside the window frame 301. An outer end of the support bracket 10 (the end towards the outdoor) extends out of the window, and the window air conditioner 200 is placed at the support bracket 10.

It should be noted that, if there is a directional indication (such as up, down, left, right, front, rear . . . ) in the embodiments of the present disclosure, the directional indication is only used to explain the relative positional relationship and movement between the components in a certain attitude (as shown in FIGS. 1 and 2). If the specific attitude changes, the directional indication changes accordingly. Besides, in the following description, the attitude is generally taken as after the mounting bracket assembly is mounted at the window.

Further, as shown in FIGS. 2, 3, 5 and 7, the support bracket 10 includes a support plate 11 provided at the bottom of the window air conditioner 200. One end of the support plate 11 is provided at the window sill 302, and the other end is used to extend out of the window. In this embodiment, as shown in FIGS. 2, 3, 5 and 7, the support plate 11 extends in the length direction of the window air conditioner 200. For other window air conditioners 200 (such as a rectangular window air conditioner 200 and the like), the support plate 11 does not necessarily extend along the length direction of the window air conditioner 200. So, in other words, the support plate 11 extends in a direction from an outdoor side of the window air conditioner 200 towards an indoor side of the window air conditioner 200.

Specially, as shown in FIGS. 2, 3, 5 and 7, the support plate 11 includes an inner support portion 111, an outer support portion 113, and an intermediate connection portion 112. The inner support portion 111 is provided above the window sill 302, the outer support portion 113 extends outside, and the outer support portion 113 is lower than the inner support portion 111. The intermediate connection portion 112 is connected to the inner support portion 111 and the outer support portion 113. Specially, the intermediate connection portion 112 is inclined. The inner support portion 111 is connected to one end (that is, the inner end) of the intermediate connection portion 112 and extends indoors. The outer support portion 113 is connected to the other end (that is, the outer end) of the intermediate connection portion 112 and extends outdoors. In this embodiment, as shown in FIGS. 2, 3, 5 and 7, the inner support portion 111 and the outer support portion 113 are both horizontal. The outer support portion 113 is located below the inner support portion 111, and the intermediate connection portion 112 is inclined to connect the inner support portion 111 and the outer support portion 113.

In this embodiment, as shown in FIG. 1, the window air conditioner 200 has a division groove 201. The division groove 201 divides the window air conditioner 200 into an indoor portion 200a and an outdoor portion 200b. The division groove 201 is provided above the inner support portion 111, an outer end of the outdoor portion 200b is provided at the outer support portion 113, an inner end of the outdoor portion 200b is optionally provided at the inner support portion 111. The division groove 201 is configured for the shield member provided at the window to extend into.

Specially, the window air conditioner 200 includes a housing (not shown), and a compressor, an outdoor heat exchanger, an outdoor fan, an indoor heat exchanger and an indoor fan (not shown) provided in the housing. The division groove 201 is provided at the housing. The compressor, the outdoor heat exchanger, and the outdoor fan are provided at the outdoor portion 200b. The indoor heat exchanger and the indoor fan are mounted in the indoor portion 200a.

Further, as shown in FIGS. 3, 5, 7 and 8, the support bracket 10 further includes a lateral fixation member 1. The lateral fixation member 1 extends along the length direction of the window sill 302. The lateral fixation member 1 is fixed to the inner side of the window frame 301 (that is, the side of the window frame 301 towards the indoor). The inner end of the support plate 11 is connected to the lateral fixation member 1 to fix the support plate 11. Specially, the inner end of the inner support portion 111 is connected to the lateral fixation member 1, and the bottom of the inner support portion 111 abuts the upper portion of the window frame 301. Optionally, the lateral fixation member 1 has an abutting surface that abuts the inner side surface of the window frame 301.

The lateral fixation member 1 is fixed to the inner side of the window frame 301. When the window air conditioner 200 is placed at the support bracket 10, the gravity of the outdoor portion 200b of the window air conditioner 200 is transmitted to the lateral fixation member 1 through the support plate 11. The lateral fixation member 1 abuts the inner side of the window frame 301 to support the window air conditioner 200 to prevent the window air conditioner 200 from turning to the outside, thereby improving the mounting stability of the window air conditioner 200. Besides, the lateral fixation member 1 and the support plate 11 may also form a stepped structure to rapidly position the support bracket 10.

Specially, the lateral fixation member 1 is provided below the indoor portion 200a of the window air conditioner 200.

In some embodiments, the inner end of the inner support portion 111 is connected to the lateral fixation member 1 through a screw lock structure.

In a specific embodiment, there are many structural forms of the lateral fixation member 1, such as a block, a plate, or a tube. The lateral fixation member 1 may be an integrally formed component or an assembly. The following uses the lateral fixation member 1 being an assembly as an example for description.

Further, as shown in FIGS. 3, 5, 7 and 8, the lateral fixation member 1 includes a lateral limiting member 12. The lateral limiting member 12 extends along the length of the window sill 302. The lateral limiting member 12 is used to abut against the inner side of the window frame 301. The inner end of the support plate 11 is connected to the lateral limiting member 12 to fix the support plate 11.

In some embodiments, the length of the lateral limiting member 12 is equivalent to the width of the window air conditioner 200 (that is, the length in the length direction of the window sill 302). That is to say, the length of the lateral limiting member 12 may be slightly larger than the width of the window air conditioner 200, may also be equal to the width of the window air conditioner 200, or may be slightly smaller than the width of the window air conditioner 200.

Further, as shown in FIGS. 3, 5, 7 and 8, the lateral fixation member 1 further includes two lateral extension members 13 provided at two ends of the lateral limiting member 12. The lateral extension member 13 extends along the length of the window sill 302. The end of the lateral extension member 13 away from the lateral limiting member 12 is used to connect with the side wall of the window to fix the lateral limiting member 12 and the lateral fixation member 1 to the inner side of the window frame 301. In this way, the mounting stability of the support bracket 10 can be guaranteed/improved.

Further, as shown in FIGS. 3, 5, 7 and 8, the lateral extension member 13 and the lateral limiting member 12 are movably engaged in the length direction of the window sill 302, so that the length of the lateral fixation member 1 in the length direction of the window sill 302 is adjustable. In this way, the support bracket 10 can be adapted to windows of different widths, the scope of application of the support bracket 10 and the mounting bracket assembly 100 is expanded, and the versatility of the support bracket 10 and the mounting bracket assembly 100 is improved.

Further, the lateral limiting member 12 is provided with first mounting positions spaced apart from each other in the length direction of the window sill 302. The lateral extension member 13 is provided with second mounting positions matching the first mounting positions. In this way, a reliable cooperation between the lateral limiting member 12 and the lateral extension member 13 can be ensured. It can be understood that the second mounting position can be selectively connected with one of the first mounting positions, so that the length of the lateral fixation member 1 in the length direction of the window sill 302 can be adjusted.

Figure 8:
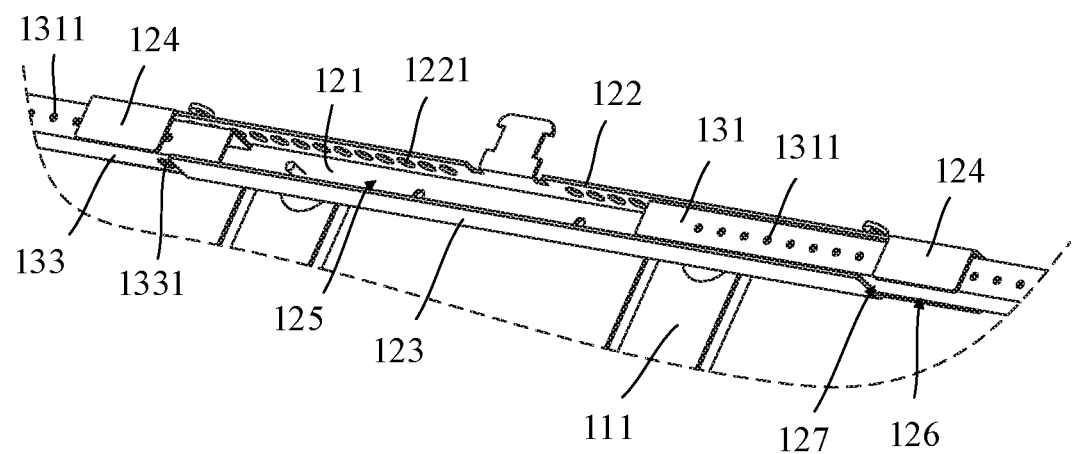
FIG. 8 is a partial enlarged view of a lateral limiting member in FIG. 7.

In this embodiment, as shown in FIG. 8, the lateral limiting member 12 is tubular, and the lateral extension member 13 is slidably arranged at the lateral limiting member 12.

Further, as shown in FIG. 8, the lateral limiting member 12 includes a limiting top plate 121, a first limiting side plate 122, a second limiting side plate 123 and two limiting bottom plates 124.

As shown in FIGS. 5 and 8, the limiting top plate 121 is disposed upward.

As shown in FIG. 8, the first limiting side plate 122 and the second limiting side plate 123 are disposed at opposite sides of the limiting top plate 121, respectively. Optionally, the first mounting position may be set on the first limiting side plate 122 or the second limiting side plate 123.

As shown in FIG. 8, two limiting bottom plates 124 are disposed at two ends of the first limiting side plate 122, respectively, and the limiting bottom plate 124 is opposite to the limiting top plate 121.

A mounting space is enclosed between the limiting top plate 121, the first limiting side plate 122, the second limiting side plate 123, and the limiting bottom plate 124. A first opening 125 communicating with the mounting space is formed between the two limiting bottom plates 124.

Further, as shown in FIG. 8, a length of the first limiting side plate 122 is greater than a length of the second limiting side plate 123, and two excess portions are formed at two ends of the first limiting side plate 122. The excess portion protrudes from the first limiting side plate 122 in the length direction of the window sill 302. Optionally, the limiting bottom plate 124 is provided at the excess portion.

The limiting bottom plate 124 and the limiting top plate 121 form a second opening 126 communicating with the mounting space on the side where the second limiting side plate 123 is located.

The lateral limiting member 12 may be a stamping member.

Figure 6:
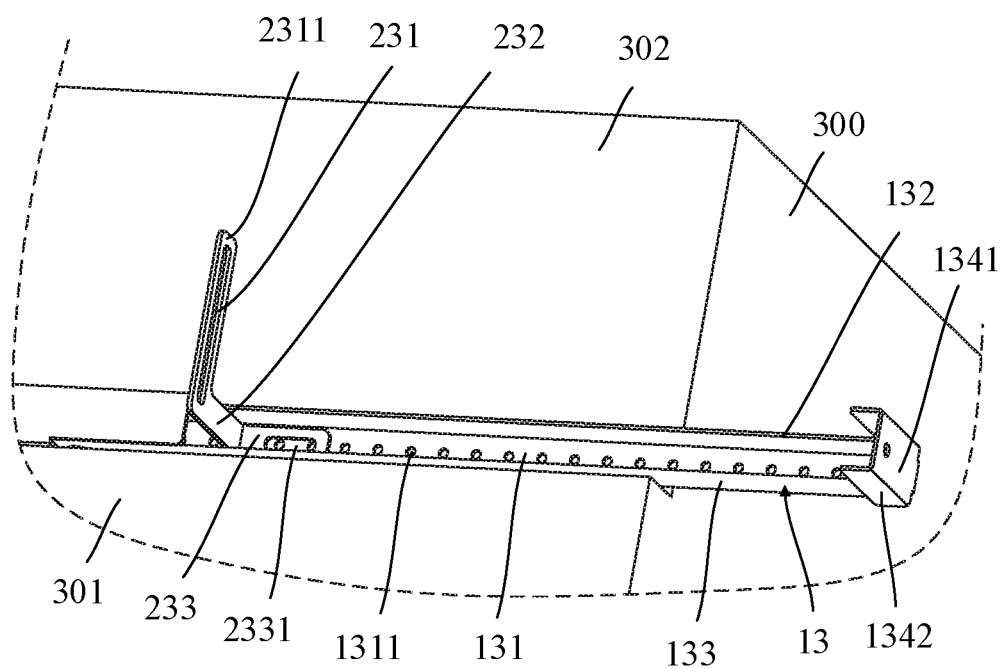
FIG. 6 is a partial enlarged view of a lateral extension member on the right side in FIG. 5.

As shown in FIGS. 5, 6 and 8, the lateral extension member 13 includes an extension bottom plate 131, a first extension side plate 132 and a second extension side plate 133. The first extension side plate 132 and the second extension side plate 133 are disposed at opposite sides of the extension bottom plate 131, respectively. An upper opening is formed on the upper edge of the first extension side plate 132 and the second extension side plate 133.

The lateral extension member 13 is slidably mounted in the mounting space, and the extension bottom plate 131 is opposite to the limiting top plate 121. The first extension side plate 132 is adjacent to the first limiting side plate 122, and the second extension side plate 133 is adjacent to the second limiting side plate 123.

As such, a first opening 125 and a second opening 126 are formed on the lateral limiting member 12. When the lateral limiting member 12 is produced by stamping, it is easy to design and produce molds, thereby it is easy to reduce the production difficulty of the lateral limiting member 12, realizing mass production, reducing production costs, and saving materials. The structural strength of the lateral limiting member 12 can also be ensured to ensure/improve the supporting effect of the window air conditioner 200.

Meanwhile, forming the second opening 126 on the lateral limiting member 12 can facilitate guiding the lateral extension member 13 into the mounting space. Forming the first opening 125 and the second opening 126 on the lateral limiting member r 12 can reduce the friction between the lateral extension member 13 and the lateral limiting member 12 so that the lateral extension member 13 slides in the mounting space.

Besides, through the above arrangement, the structure of the lateral extension member 13 can also be simplified, and by placing the extension bottom plate 131 and the limiting top plate 121 oppositely, the connection strength of the lateral limiting member 12 and the lateral extension member 13 can also be improved.

Further, as shown in FIG. 8, the limiting bottom plate 124 and the second limiting side plate 123 are spaced apart from each other in the length direction of the window sill 302 (that is, the length direction of the lateral limiting member 12), to form a third opening 127 communicating with the mounting space between the second limiting side plate 123 and the second opening 126. In this way, the friction between the lateral extension member 13 and the lateral limiting member 12 can be reduced to facilitate the insertion of the lateral extension member 13 into the mounting space.

In addition, by providing the first opening 125, the second opening 126, and the third opening 127, it is convenient to realize mold opening to achieve mass production.

Further, the lateral limiting member 12 is an integrated bending structure.

Further, as shown in FIG. 8, the first mounting position is a first connection hole 1221 provided at the first limiting side plate 122 and penetrating through the first limiting side plate 122. A plurality of first connection holes 1221 are spaced apart from each other in the length direction of the window sill 302. The second mounting position is a second connection hole (not shown) provided at the first extension side plate 132 and penetrating through the first extension side plate 132.

Fasteners (such as screws or pins) pass through the first connection hole 1221 and the second connection hole to connect the first limiting side plate 122 and the first extension side plate 132, to ensure the stability of the length of the lateral fixation member 1, thereby ensuring the reliability of the support bracket 10.

In some embodiment, the first limiting side plate 122 faces the indoor direction. The second limiting side plate 123 is configured to abut the inner side surface of the window frame 301, and the limiting bottom plate 124 is configured to be set towards the countertop of the window sill 302. Optionally, the limit bottom plate 124 is configured to abut the countertop of the window sill 302.

Figure 7:
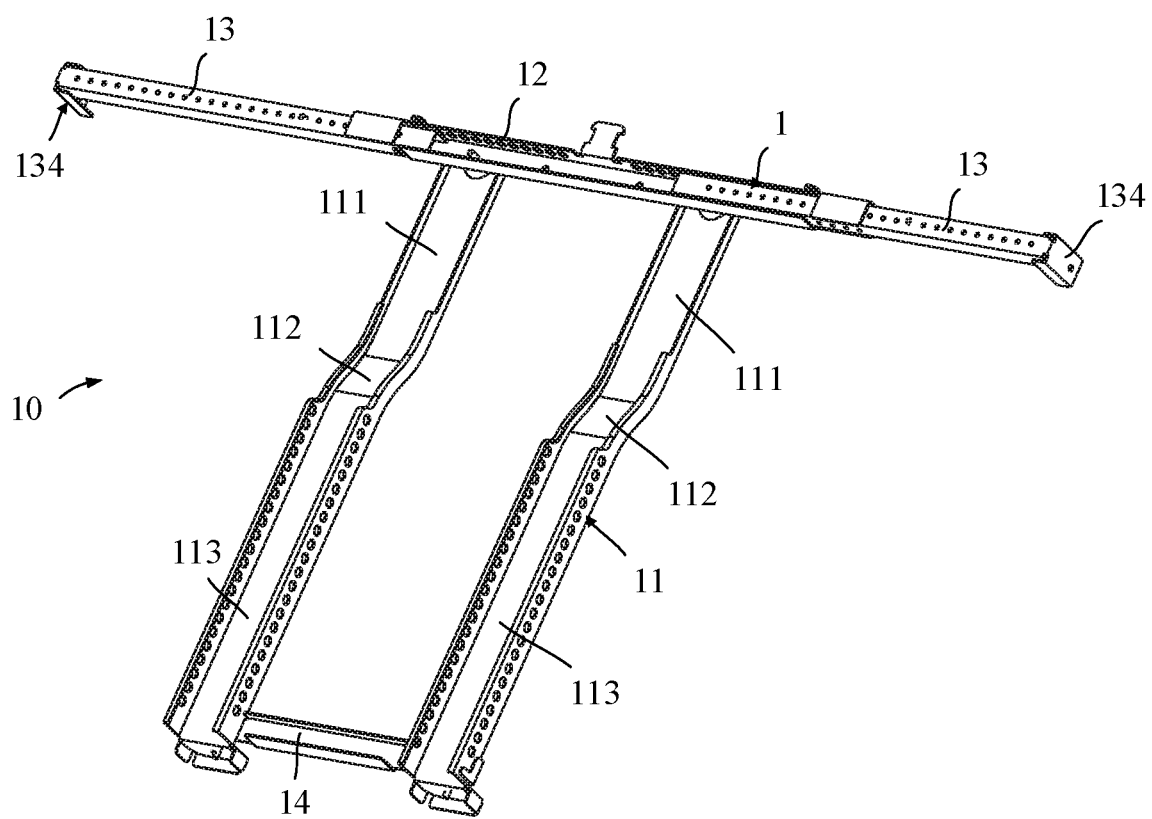
FIG. 7 is a schematic structural diagram of the support bracket in FIG. 5.

Further, as shown in FIGS. 5 to 7, the lateral extension member 13 further includes an extension mounting portion 134. The extension mounting portion 134 is disposed at an end of the extension bottom plate 131 away from the lateral limiting member 12. The extension mounting portion 134 is configured to connect with the side wall of the window. In this way, by providing the extension mounting portion 134, the lateral extension member 13 can be fixed on the side wall of the window, so that the lateral fixation member 1 can fixedly abut against the inner side of the window frame 301.

As shown in FIG. 6, the extension mounting portion 134 includes an extension mounting plate 1341 that is bent and extended from one end of the extension bottom plate 131 away from the lateral limiting member 12 to one side, and the extension mounting plate 1341 is configured to connect with the side wall of the window. The extension mounting plate 1341 is configured for fitting with the side wall of the window for connecting with the side wall of the window.

In some embodiment, the extension mounting plate 1341 is provided with connecting via holes (not shown). Fasteners (screws, etc.) (not shown) pass through the connecting via holes and are used for threaded connection with the side wall of the window. The connecting via hole may be a threaded hole to improve connection strength and connection stability.

In some embodiment, the extension mounting plate 1341 and the extension side plate are located on the same side of the extension bottom plate 131.

Further, as shown in FIG. 6, the extension mounting portion 134 further includes two extension reinforcement plates 1342 disposed at opposite sides of the extension mounting plate 1341, The extension reinforcement plate 1342 is disposed inside or outside the extension side plate of the lateral extension member 13. Specially, the two extension reinforcement plates 1342 are a first extension reinforcement plate and a second extension reinforcement plate. The first extension reinforcement plate corresponds to the first extension side plate 132, and the second extension reinforcement plate corresponds to the second extension side plate 133. Moreover, the first extension reinforcement plate is provided inside or outside the first extension side plate 132, and/or the second extension reinforcement plate is provided inside or outside the second extension side plate 133.

In this way, the structural strength of the extension mounting portion 134 can be enhanced to enhance the connection stability of the extension mounting portion 134 and the side wall of the window.

In some embodiment, the extension reinforcement plate 1342 is provided outside the extension side plate.

In some embodiment, the extension reinforcement plate 1342 is fixedly connected to the extension side plate (such as welding, or screw structure connection, etc.).

Further, as shown in FIGS. 1, 2 and 5, the connection member 20 is provided at the window, and the connection member is configured to connect the window air conditioner 200 and the support bracket 10.

In an embodiment, the upper end (i.e., one end) of the connection member 20 is configured to connect to the window air conditioner 200, and the lower end (i.e., the other end) of the connection member 20 is connected to the support bracket 10. In some other embodiments, the connection member 20 is substantially horizontal. One end of the connection member 20 (that is, the end near the window air conditioner 200) is configured to connect to the window air conditioner 200, and the other end (that is, the end away from the window air conditioner 200) is connected to the support bracket 10.

In a specific embodiment, the connection member 20 may be provided inside the window frame 301 (i.e., the side towards the indoor) or outside the window frame 301 (i.e., the side towards the outdoor).

When the connection member 20 is provided inside the window frame 301, the connection member 20 may limit the window air conditioner 200. For example, when the window air conditioner 200 is lifted upwards, the connection member 20 may pull the window air conditioner 200 to prevent the window air conditioner 200 from being lifted up to the outside. For another example, when the window air conditioner 200 is pressed down, the connection member 20 may support the window air conditioner 200 to prevent the window air conditioner 200 from being pressed down and falling to the inside. That is to say, the connection member 20 is configured to connect the support bracket 10 and the window air conditioner 200. Not only can the window air conditioner 200 be prevented from being lifted up to the outside, but also the window air conditioner 200 can be prevented from being pressed down and falling to the inside, thereby improving the mounting stability of the window air conditioner 200.

When the connection member 20 is provided outside the window frame 301, the connection member 20 may limit the window air conditioner 200. For example, when the window air conditioner 200 is lifted upwards, the connection member 20 may pull the window air conditioner 200 to prevent the window air conditioner 200 from being lifted up to the outside. For another example, when the window air conditioner 200 is pressed down, the connection member 20 may support the window air conditioner 200 to prevent the window air conditioner 200 from being pressed down and falling to the inside. That is to say, the connection member 20 is configured to connect the support bracket 10 and the window air conditioner 200. Not only can the window air conditioner 200 be prevented from being lifted up to the outside, but also the window air conditioner 200 can be prevented from being pressed down and falling to the inside, thereby improving the mounting stability of the window air conditioner 200.

Therefore, in the technical solutions of the present disclosure, the connection member 20 is configured to connect the support bracket 10 and the window air conditioner 200. Not only can the window air conditioner 200 be prevented from being lifted up to the outside, but also the window air conditioner 200 can be prevented from being pressed down and falling to the inside, thereby improving the mounting stability of the window air conditioner 200.

In this embodiment, the connection member 20 is disposed inside the window frame 301. In this way, the connection member 20 only needs to be installed indoors and has a large mounting space, so that the connection member 20 can be easily installed.

Specially, the lower end (i.e., the other end) of the connection member 20 is connected to the lateral extension member 13.

Further, as shown in FIGS. 1, 2, 5 and 6, the upper end (i.e., one end) of the connection member 20 is configured to connect to the side of the window air conditioner 200. Specifically, the upper end (that is, one end) of the connection member 20 is configured to be provided at one side of the window air conditioner 200, such that the upper end (i.e., one end) of the connection member 20 is configured to connect to the side of the window air conditioner 200. In this way, not only the mounting space of the connection member 20 but also the acting force arm of the connection member 20 and the window air conditioner 200 can be increased, so that the mounting stability of the window air conditioner 200 can be improved. Of course, in some other embodiments, the upper end (i.e., one end) of the connection member 20 may also be connected to the bottom of the window air conditioner 200. Or, the upper end (i.e., one end) of the connection member 20 may be connected to both the bottom of the window air conditioner 200 and the side of the window air conditioner 200.

Further, the connection member 20 includes a plurality of (larger than or equal to two) support connection positions sequentially distributed in the direction from the outdoor side of the window air conditioner 200 towards the indoor side. A plurality of the support connection positions are configured to selectively connect with the window air conditioner 200. It can be understood that the direction in which the outdoor side of the window air conditioner 200 faces the indoor side is the direction in which one end of the support bracket 10 faces the other end, that is, the length direction of the support bracket 10.

As such, when the window air conditioner 200 is placed at the support bracket 10, it can be moved (appropriately) indoors or outdoors (i.e., in the length direction of the support bracket 10). Therefore, the position of the window air conditioner 200 in the length direction of the support bracket 10 can be adjusted according to the gravity distribution of the window air conditioner 200, etc., so as to ensure/improve the mounting stability of the window air conditioner 200. In addition, the position of the window air conditioner 200 in the length direction of the support bracket 10 can also be adjusted according to the length of different window air conditioners 200, to ensure the mounting stability of different window air conditioners 200, the connection member 20 is suitable for window air conditioners 200 of different lengths.

Further, as shown in FIGS. 1, 2, 5, and 6, the connection member 20 is provided with a support connection hole 2311, the support connection hole 2311 is an elongated hole extending in the direction from the outdoor side of the window air conditioner 200 towards the indoor side of the window air conditioner 200, and the support connection positions are provided at the support connection hole 2311. The window air conditioner 200 is provided with a preset connection position 202 that is cooperatively connected with the support connection hole 2311. Specifically, the preset connection position 202 may be, but is not limited to, a screw connection hole, a stud, or the like.

As such, a plurality of the support connection positions are formed through the elongated holes, which can facilitate the alignment of the support connection position with the preset connection position 202 to facilitate installation.

In some other embodiments, the support connection positions may also be formed by other means. For example, the connection member 20 is provided with a plurality of connection holes spaced apart from each other in the direction from the outdoor side of the window air conditioner 200 towards the indoor side, so as to form a plurality of support connection positions, and so on.

In this embodiment, the preset connection position 202 is provided at the side of the window air conditioner 200 so that the upper end (i.e., one end) of the connection member 20 is connected to the side of the window air conditioner 200.

In this embodiment, the support connection positions are provided at the upper end (i.e., one end) of the connection member 20. In some other embodiments, for example, in the embodiment in which the connection member 20 is substantially horizontal, the support connection positions are provided at the end of the supporting member close to the window air conditioner 200.

The following describes the specific shape of the connection member. In an embodiment, as shown in FIGS. 1, 2, 5 and 6, the connection member 20 includes a first connection portion and a second connection portion connected to the first connection portion, the second connection portion is configured to connect to the mounting bracket assembly 100 (specifically, the support bracket 10). The first connection portion extends in a direction from the outdoor side of the window air conditioner 200 towards the indoor side, and the first connection portion is configured to connect to the window air conditioner 200. In this way, by providing the second connection member extending in the direction from the outdoor side of the window air conditioner 200 towards the indoor side for connecting to the window air conditioner 200, it is convenient to increase the acting force arm of the connection member 20 and the window air conditioner 200 to improve the mounting stability of the window air conditioner 200.

Further, the second connection portion includes a vertical support portion extending in the up-down direction, and the first connection portion is provided at one end of the vertical support portion. The vertical support portion is connected to the window air conditioner 200 through the first connection portion. The other end of the vertical support portion is connected to the support bracket 10. In this way, by providing the vertical support portion, the connection member 20 can be connected to the support bracket 10.

In some embodiment, the vertical support portion is plate-shaped, that is, the vertical support portion is a vertical support plate 232. The first connection portion is plate-shaped, that is, the first connection portion is a horizontal connection plate 231. That is, as shown in FIGS. 1, 2, 5, and 6, the connection member 20 includes a vertical support plate 232 extending in the up-down direction and a horizontal connection plate 231 provided at the upper end of the vertical support plate 232. The horizontal connection plate 231 extends along the outdoor side of the window air conditioner 200 towards the indoor side. The horizontal connection plate 231 is connected to the window air conditioner 200, and the lower end of the vertical support plate 232 is connected to the support bracket 10.

As such, the structure of the connection member can be simplified to facilitate its connection with other components.

Optionally, the side of the horizontal connection plate 231 is attached to the side of the window air conditioner 200, so that the connection member 20 is connected to the side of the window air conditioner 200.

Further, as shown in FIGS. 1-3 and 5, the first connection portion (specifically, the horizontal connection plate 231) extends away from the window frame 301. In this way, on the one hand, the acting force arm of the connection member 20 and the window air conditioner 200 can be increased, thereby improving the mounting stability of the window air conditioner 200. On the other hand, the connection member 20 can also have a larger mounting space to facilitate installation.

The first connection portion (specifically, the horizontal connection plate 231) may also extend towards the outdoor. In this way, the horizontal connection plate 231 may extend through the window frame 301 to the outdoor.

It should be noted that when the connection member 20 is disposed outside the window frame 301, the first connection portion (specifically, the horizontal connection plate 231) extends away from the window frame 301. It is also possible to increase the acting force arm of the connection member 20 and the window air conditioner 200, and to make the connection member 20 have a larger mounting space.

In some other embodiments, the vertical support portion and the first connection portion may also be provided in other shapes, such as a columnar shape or a tubular shape.

Further, as shown in FIGS. 1, 2, 5 and 6, a plurality of the support connection positions are provided at the first connection portion (specifically, the horizontal connection plate 231).

Specially, the support connection hole 2311 is provided at the first connection portion (specifically, the horizontal connection plate 231) to form a plurality of support connection positions; or, the first connection portion (specifically, the horizontal connection plate 231) is provided with a plurality of connection holes spaced in sequence in the direction from the outdoor side of the window air conditioner 200 towards the indoor side to form a plurality of support connection positions.

Further, the second connection portion further includes a horizontal fixation portion provided at the other end of the vertical support portion, the horizontal fixation portion extends along the length direction of the window sill 302 (which, in some embodiments, can be approximately perpendicular to the direction from the outdoor side of the window air conditioner 200 towards the indoor side, and be approximately perpendicular to the up-down direction), and the horizontal fixation portion is used to connect to the support bracket 10.

Specially, the horizontal fixation portion is plate-shaped, that is, the horizontal fixation portion is a horizontal fixation plate 233. That is, as shown in FIGS. 1, 2, 5, and 6, the connection member 20 further includes a horizontal fixation plate 233 provided at the lower end of the vertical support plate 232. The horizontal fixation plate 233 extends along the length direction of the window sill 302, and the horizontal fixation plate 233 is connected to the support bracket 10. Optionally, the horizontal fixation plate 233 is formed by bending the lower end of the vertical support plate 232 towards one side of the vertical support plate 232.

A horizontal fixation portion (specifically, the horizontal fixation plate 233) is provided at the lower end of the vertical support plate portion (specifically, the vertical support plate 232), which can facilitate connecting the connection member 20 to the support bracket 10, and can ensure the connection strength between the connection member 20 and the support bracket 10. It can be understood that, in some other embodiments, the lower end of the connection member 20 may be directly welded to the support bracket 10.

In some other embodiments, the horizontal fixing portion may have another shape, such as columnar shape or tubular shape.

In some other embodiments, as shown in FIGS. 1, 2, 5 and 6, the horizontal fixation portion (specifically, the horizontal fixation plate 233) extends away from the lateral limiting member 12 to improve the supporting effect.

In this embodiment, the horizontal fixation portion (specifically, the horizontal fixation plate 233) is connected to the lateral extension member 13.

Further, as shown in FIGS. 1, 2, 5 and 6, the connection member 20 has a plate-like structure. In this way, the structure of the connection member 20 can be simplified.

Specially, the vertical support plate 232 and the horizontal connection plate 231 are coplanar, and the horizontal fixation plate 233 extends to one side. In this way, when the window air conditioner is lifted or pressed down, the horizontal connection plate 231 and the vertical support plate 232 can provide a greater pulling or supporting effect, such that the function of the connection member 20 can be improved.

Further, the connection member 20 is movable relative to the lateral fixation member 1 (lateral extension member 13) in the length direction of the lateral fixation member 1 (lateral extension member 13), to make the connection position of the other end of the connection member 20 (horizontal fixation member) and the lateral fixation member 1 (lateral extension member 13) adjustable in the length direction of the horizontal extension member 13, to apply the window air conditioner 200 with different widths; combined with the movable feature of the lateral extension member 13, different types of windows can be applied; in turn, the applicability of the mounting bracket assembly 100 can be improved.

Specially, the horizontal fixation portion (the horizontal fixation plate 233) is connected to the lateral extension member 13 (the extension bottom plate 131). The connection member 20 can extend into the lateral extension member 13 from the upper opening of the lateral extension member 13, so that the horizontal fixation portion (the horizontal fixation plate 233) is connected to the extension bottom plate 131.

As such, the connection member 20 (horizontal fixation portion) is extended into the lateral extension member 13, and the extension side plate (the first extension side plate and/or the second extension side plate) of the lateral extension member 13 can limit and support the connection member 20. Therefore, the connection effect of the connection member 20 can be improved, so that the window air conditioner 200 is firmly mounted.

Further, as shown in FIGS. 3-8, the extension bottom plate 131 is provided with a plurality of (i.e., greater than or equal to two) first fixation connection holes 1311 spaced apart from each other in the longitudinal direction of the lateral extension member 13. The horizontal fixation portion (the horizontal fixation plate 233) is provided with a second fixation connection hole 2331 that cooperates with the first fixation connection hole 1311. In this way, the second fixation connection hole 2331 can be selectively connected to the first fixation connection hole 1311, so that the connection position of the horizontal fixation plate 233 and the extension bottom plate 131 can be adjusted in the length direction of the lateral extension member 13.

Specifically, fasteners (such as screws, pins, etc.) are sequentially passed through the first fixation connection hole 1311 and the second fixation connection hole 2331 to connect the horizontal fixation plate 233 and the extension bottom plate 131 to ensure the reliability of the connection member 20.

Figure 4:
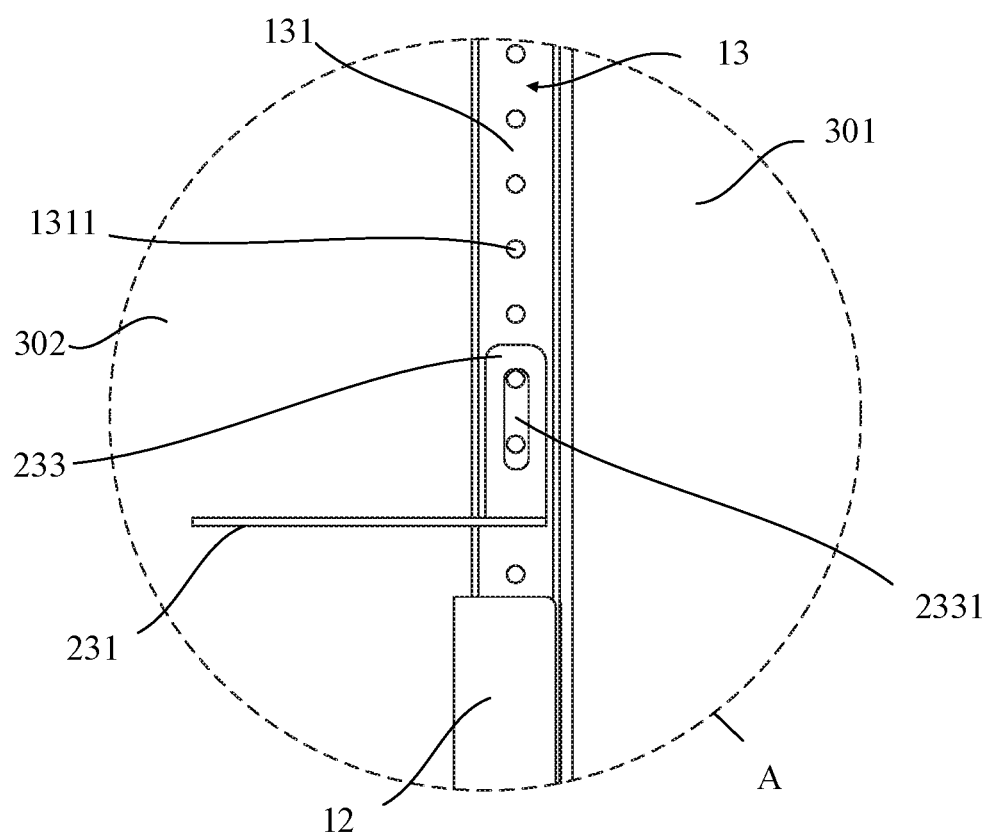
FIG. 4 is a partial enlarged view of portion A in FIG. 3.

Further, as shown in FIGS. 4 and 6, the second fixation connection hole 2331 is an elongated hole extending along the length direction of the lateral extension member 13. In this way, the alignment range of the first fixation connection hole 1311 and the second fixation connection hole 2331 can be increased. Therefore, the connection member 20 can be moved at a small distance, so that the connection member 20 can be better connected to the side of the window air conditioner 200.

In this embodiment, the second fixation connection hole 2331 can be selected to connect the two first fixation connection holes 1311 to improve the connection strength of the horizontal fixation plate 233 and the extension bottom plate 131 to improve the connection stability of the connection member 20.

Figure 3:
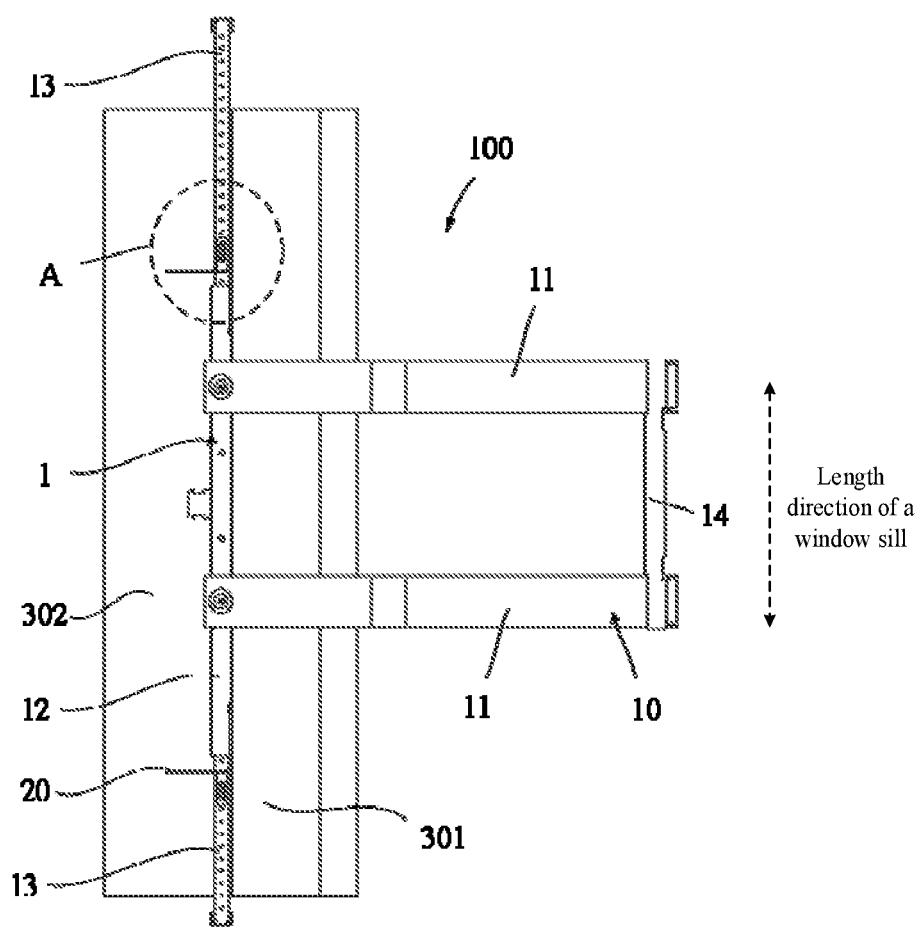
FIG. 3 is a top view of the mounting bracket assembly in FIG. 2.

Further, as shown in FIGS. 3 and 5, two connection members 20 are provided so as to be disposed at two sides of the window air conditioner 200, respectively. In this embodiment, the two connection members 20 are mounted at the two lateral extension members 13, respectively.

Further, as shown in FIG. 8, the second extension side plate 133 is provided with an auxiliary connection hole 1331, and the auxiliary connection hole 1331 can be used for cooperating with the first connection hole 1221. In this way, any one of the lateral extension members 13 can be inserted into one end of the lateral limiting member 12 and the other end of the lateral limiting member 12, so that the convenience of using the lateral extension member 13 can be improved. In addition, when the connection structure (e.g., the second connection hole) on the first extension side plate 132 is damaged, the second extension side plate 133 can also be connected to the lateral limiting member 12 and the like, thereby extending the service life of the lateral extension member 13. In some embodiment, the first extension side plate 132 and the second extension side plate 133 can be used alternately to increase the service life of the lateral extension member 13.

In some other embodiments, the horizontal fixation portion (the horizontal fixation plate 233) may also be connected to the first extension side plate 132 or the second extension side plate 133 of the lateral extension member 13. In this solution, optionally, the vertical support plate 232 and the horizontal fixation plate 233 are coplanar, and the horizontal connection plate 231 extends to one side of the plate. The horizontal fixation plate 233 is connected to the first extension side plate 132 or the second extension side plate 133.

In some other embodiments, the connection member 20 may also have other shapes, for example, the connection member includes a second connection portion and a first connection portion extending in a direction from the outdoor side of the window air conditioner 200 towards the indoor side. The second connection portion (i.e., the horizontal fixation portion) intersects the first connection portion so that the connection member has an L shape (approximately). The first connection portion is disposed near the window air conditioner to connect with the window air conditioner 200, and the second connection portion (i.e., the horizontal fixation portion) is connected to the support bracket 10. Of course, in some other embodiments, the connection member 20 can also be connected to other positions of the support bracket 10, for example, the connection member 20 can be connected to the lateral limiting member 12. In some embodiment, the connection member 20 may be connected to the support plate.

Further, as shown in FIGS. 1 and 2, the outdoor support is mounted at the support bracket 10, and the outdoor support is used to support the wall 300 to improve the installation reliability of the window air conditioner 200.

Specially, the outdoor support is an outdoor diagonal support 30. As shown in FIGS. 1 and 2, the upper end (i.e., one end) of the outdoor diagonal support 30 is connected to the support bracket 10, and the lower end (i.e., the other end) of the outdoor diagonal support 30 abuts against the wall 300. Specifically, the upper end of the outdoor diagonal support 30 is connected to the support plate 11.

As such, the outdoor diagonal support 30 supports the support plate 11 and the support bracket 10, which can improve the mounting stability of the mounting bracket assembly 100, thereby improving the installation reliability of the window air conditioner 200.

Specifically, as shown in FIGS. 1 and 2, the upper end of the outdoor diagonal support 30 is connected to the outer support 113. Further, as shown in FIGS. 1 and 2, the lower end of the outdoor diagonal support 30 is provided with a support foot 40 for abutment with the wall 300. The support foot 40 includes a rotating member and a damping member, the rotating member has a rotational connection position to be rotatably connected to the lower end of the outdoor diagonal support 30. The rotating member has a resistance acting surface for facing the wall 300, the damping member is provided at the resistance acting surface, and the damping member is for abutting against the wall 300.

As such, the rotating member can connect the outdoor diagonal support 30 and the damping member together, and the rotating member can rotate relative to the wall 300, thereby making the support foot 40 suitable for matching with the wall 300 at different tilt angles. When the window air conditioner 200 is placed at the mounting bracket assembly 100, the mounting bracket assembly 100 can transmit pressure to the rotating member and the damping member through the outdoor diagonal support 30, and the damping member and the wall 300 closely fit together. Due to the higher friction coefficient of the damping member, a greater frictional force can be provided between the support foot 40 and the wall 300. Therefore, the support foot 40 can firmly abut against the wall 300, and the cooperation structure between the outdoor diagonal support 30 and the wall 300 can be made stronger.

Optionally, the surface of the damping member against the wall 300 is a non-smooth surface, so that the friction between the support foot 40 and the wall 300 can be increased.

Further, as shown in FIGS. 1 and 2, the rotation connection position (specifically, the rotation axis) is disposed near/biased to the upper end of the rotating member. In this way, on the one hand, the pressure can be better transmitted to the support foot 40, so that the support foot 40 can more firmly abut against the wall surface to improve the stability of the support foot 40. On the other hand, during installation, under the effect of its own gravity, the resistance action surface of the support foot 40 and the damping member 42 can naturally face the wall 300, thereby reducing the installation difficulty.

In this embodiment, the rotation connection position is provided at the upper end of the rotating member.

Further, as shown in FIGS. 5 and 7, there are two support plates 11 in the length direction of the window sill 302 or in the width direction of the window air conditioner 200, and the outdoor oblique support 30 is provided with two correspondingly. In this way, the support stability of the window air conditioner 200 can be improved.

Further, as shown in FIGS. 5 and 7, the support bracket 10 further includes a lateral connection plate 14 that connects the two support plates 11. In this way, the support capacity of the support bracket 10 can be improved.

As shown in FIGS. 5 and 7, the lateral connection plate 14 is provided at the end of the outer support 113 that is away from the window frame 301.

The above are only some embodiments of the present disclosure, and do not limit the scope of the present disclosure thereto. Under the inventive concept of the present disclosure, equivalent structural transformations made according to the description and drawings of the present disclosure, or direct/indirect application in other related technical fields are included in the scope of the present disclosure.

What is claimed is:

1. A connection member comprising:
   a first connection portion configured to be connected to a window air conditioner, the first connection portion extending along a direction; and
   a second connection portion connected to the first connection portion and being configured to be connected to a support bracket of a mounting bracket assembly, the second connection portion including a vertical support portion and a horizontal fixation portion;
   wherein:
   the horizontal fixation portion is connected to the first connection portion through the vertical support portion; and
   the vertical support portion is connected to the support bracket through the horizontal fixation portion.

2. The connection member of claim 1, wherein:
   the direction is a first direction; and
   the horizontal fixation portion extends in a second direction approximately perpendicular to the first direction and is configured to be connected to the mounting bracket assembly.

3. The connection member of claim 2, wherein the horizontal fixation portion includes a fixation connection hole configured to be cooperatively connected with a corresponding fixation connection hole at the mounting bracket assembly.

4. The connection member of claim 3, wherein the fixation connection hole at the horizontal fixation portion is an elongated hole extending in the second direction.

5. The connection member of claim 2, wherein:
   the vertical support portion extends in a third direction approximately perpendicular to the first direction and the second direction;
   the first connection portion is provided at one end of the vertical support portion; and
   the horizontal fixation portion is provided at another end of the vertical support portion.

6. The connection member of claim 5, wherein the horizontal fixation portion includes a horizontal fixation plate, the vertical support portion includes a vertical support plate, and the first connection portion includes a horizontal connection plate.

7. The connection member of claim 6, wherein the vertical support plate is coplanar with the horizontal connection plate.

8. A mounting bracket assembly comprising:
a support bracket, one end of the support bracket being configured to be mounted inside a window frame, and another end of the support bracket being configured to extend outside the window frame; and
the connection member of claim 1, an upper end of the connection member being configured to be connected to the window air conditioner, and a lower end of the connection member being connected to the support bracket.

9. The mounting bracket assembly of claim 8, wherein:
the connection member is configured to be provided inside the window frame; and/or
the upper end of the connection member is configured to be connected to a side of the window air conditioner.

10. The mounting bracket assembly of claim 8, wherein the upper end of the connection member includes a support connection hole configured to provide a plurality of support connection positions sequentially distributed in a length direction of the support bracket, the length direction of the support bracket being a direction from the one end of the support bracket to the other end of the support bracket, and the support connection positions being configured to be selectively connected to the window air conditioner.

11. The mounting bracket assembly of claim 10, wherein the the support connection hole is an elongated hole extending in the length direction of the support bracket.

12. The mounting bracket assembly of claim 10, wherein the connection member includes:
a vertical support plate extending in an up-down direction, a lower end of the vertical support plate being connected to the support bracket; and
a horizontal connection plate provided at an upper end of the vertical support plate and extending in the length direction of the support bracket, and the support connection hole being provided at the horizontal connection plate.

13. The mounting bracket assembly of claim 12, wherein:
the horizontal connection plate is configured to extend away from the window frame; and or
the connection member further includes a horizontal fixation plate provided at a lower end of the vertical support plate, the horizontal fixation plate being connected to the support bracket and extending in a direction approximately perpendicular to the up-down direction and the length direction of the support bracket.

14. The mounting bracket assembly of claim 8, wherein:
the support bracket includes a lateral fixation member configured to be fixed to an inner side of the window frame, the lateral fixation member extending in an extension direction approximately perpendicular to a length direction of the support bracket;
the lateral fixation member includes:
a lateral limiting member configured to abut against the inner side of the window frame; and
a lateral extension member provided at one end of the lateral limiting member, an end of the lateral extension member away from the lateral limiting member being configured to be connected to a side wall of a window;
wherein the lateral extension member and the lateral limiting member are movable relative to each other in the extension direction to adjust a length of the lateral fixation member in the extension direction; and
a lower end of the connection member is mounted at the lateral extension member.

15. The mounting bracket assembly of claim 14, wherein the connection member is movable relative to the lateral extension member in a length direction of the lateral extension member, and a connection position between a lower end of the connection member and the lateral extension member is adjustable in the length direction of the lateral extension member.

16. The mounting bracket assembly of claim 15, wherein:
the lateral extension member includes:
an extension bottom plate including a plurality of first fixation connection holes spaced apart from each other in the length direction of the lateral extension member; and
a first extension side plate and a second extension side plate disposed at opposite side edges of the extension bottom plate, respectively; and
the connection member includes a horizontal fixation plate including a plurality of second fixation connection holes matching the first fixation connection holes.

17. A window air conditioner assembly comprising:
a mounting bracket assembly comprising:
a support bracket, one end of the support bracket being configured to be mounted inside a window frame, and another end of the support bracket being configured to extend outside the window frame; and
the connection member of claim 1, a lower end of the connection member being connected to the support bracket; and
a window air conditioner mounted at the support bracket and connected to an upper end of the connection member.

18. The window air conditioner assembly of claim 17, wherein:
the upper end of the connection member is connected to a side of the window air conditioner; and/or
the window air conditioner includes a division groove dividing the window air conditioner into an indoor portion and an outdoor portion.

19. The connection member of claim 1, wherein the first connection portion includes a support connection hole configured to provide a plurality of support connection positions sequentially distributed along the direction, and the plurality of support connection positions are configured to be selectively connected to the window air conditioner.

20. The connection member of claim 19, wherein:
the first connection portion includes a support connection hole, the support connection hole being an elongated hole extending in the direction;
the plurality of support connection positions are provided at the support connection hole.

* * * * *